B. TOWN.
Grain-Drill Attachment.

No. 208,549. Patented Oct. 1, 1878.

Witnesses
Fred. G. Dieterich
M. Gardner

Inventor
Byron Town
by
DeWitt C. Allen
Atty

N. PETERS, PHOTO-LITHOGRAPHER, WASHINGTON, D.C.

UNITED STATES PATENT OFFICE.

BYRON TOWN, OF FOND DU LAC, WISCONSIN.

IMPROVEMENT IN GRAIN-DRILL ATTACHMENTS.

Specification forming part of Letters Patent No. 208,549, dated October 1, 1878; application filed September 5, 1878.

*To all whom it may concern:*

Be it known that I, BYRON TOWN, of Fond du Lac, in the county of Fond du Lac and State of Wisconsin, have invented certain new and useful Improvements in Force-Feed Grass-Seed Attachments for Grain-Drills and Broadcast-Seeders; and I do hereby declare the following to be a full, clear, and exact description of the same, reference being made to the accompanying drawings, forming a part of this specification, and in which—

Figure 1:
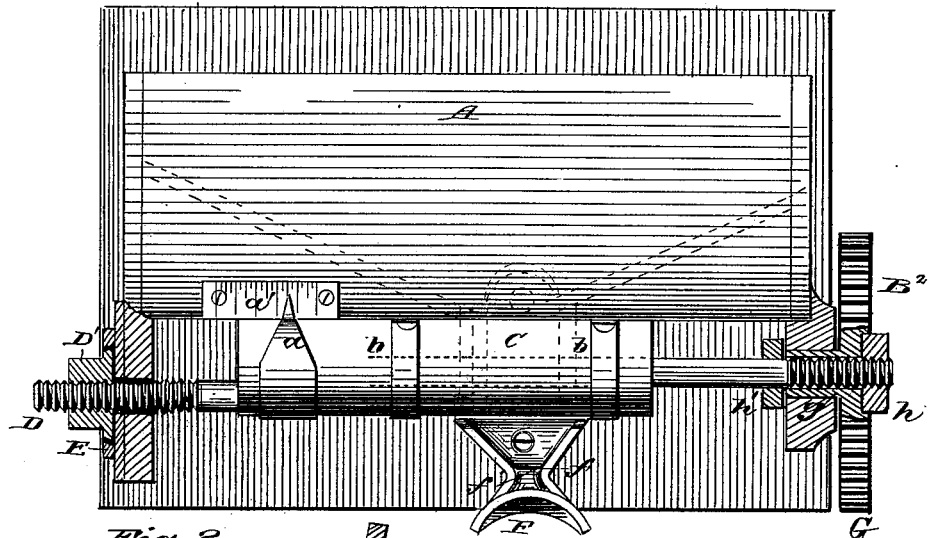
Figure 2:
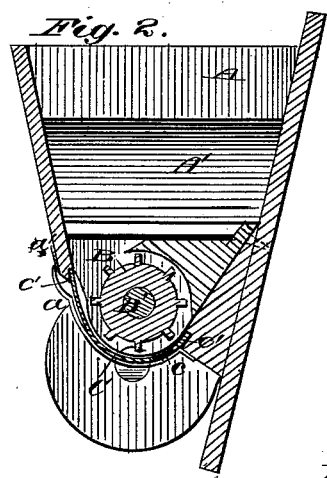
Figure 3:
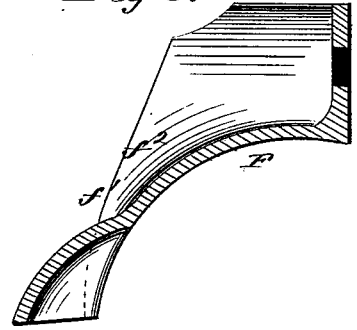
Figure 4:
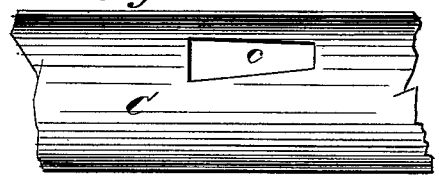
Figure 5:
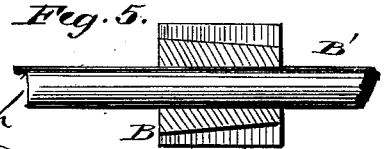

Figure 1 is a rear view, partly in section, of my improved machine; Fig. 2, transverse section of the same. Figs. 3, 4, and 5 are detail views.

This invention relates to improvements in force-feed grass-seed attachments, to be used in combination with grain-drills or broadcast-seeders; and the invention consists in the combination, with a feed-case and feed-wheel, of a slotted semicircular plate forming the bottom of the feed-case, and adapted to be moved laterally or transversely to increase or diminish the quantity of seed to be sown per acre.

It also consists in the combination, with said laterally-adjustable semicircular slotted bottom, of a pointer and registering-plate to indicate the quantity of seed sown per acre.

It further consists in a novel construction of a scattering or distributing device; and it finally consists in a novel arrangement of devices for throwing the feed-shaft in and out of gear, all as will be hereinafter fully described.

In the drawings, A represents the seed-box, having centrally arranged in the bottom thereof the feed-case A', which incloses the conical feed-wheel or ribbed cone B, mounted on a shaft, $B^1$, driven by a gear, $B^2$, which meshes into a gear upon a drill or seeder in the usual manner. The bottom of the feed-case is formed of a semicircular metallic plate, C, provided with a nearly V-shaped slot, $c$, as shown in Fig. 4, for the discharge of the seed, and which is arranged near the upper edge or above the center of the plate, to prevent the seed from running out when the feed-wheel is not in motion, as clearly shown in Figs. 2 and 4. This semicircular plate or bottom of the case is adapted to be moved laterally in the grooves $c'$ $c'$ of the seed-box by means of a screw-rod, D, connected to one end thereof and a flanged nut, D', said nut being held in position by an outer flanged plate, E, secured to the end of the seed-box. By turning said flanged nut D' the semicircular bottom of the feed-case is adjusted or moved laterally, thus increasing or diminishing the size of the discharge-opening, whereby the quantity of seed desired to be sown is regulated. Attached to and moving with the laterally-adjustable bottom is a pointer, $a$, extending to the side of the seed-box, upon which a registering-plate, $a'$, is secured, whereby the quantity of seed sown per acre is indicated. The semicircular plate or bottom of the feed-case is held in position by small metallic straps $b\ b$, fastened to the seed-box, to allow it to be moved laterally.

F represents the scatterer, removably secured to the seed-box, said scatterer being formed wide at the point where the seed falls into it, from which it converges to a narrow neck or point, $f$, from which point it is again made wide, with a convex portion, $f^1$, which forms two side radiating channels, $f^2\ f^2$. By this construction of scatterer the seed is gathered at the neck or point $f$, from which it is thrown off in a fine spray or broadcast.

The gear G is formed with a hub, $g$, which passes through one end of the seed-box, said gear and hub being clamped between screw-nut $h$ and stationary nut $h'$. By loosening the nut $h$ the gear and hub will turn on the feed-shaft, while said shaft remains stationary, and by tightening said nut $h$ the shaft will revolve with the gear and hub.

By the above-described arrangement of devices the feed-shaft can be easily and quickly thrown in and out of gear when desired. This grass-seed attachment is to be fastened to the side of the grain or seed box of a drill or seeder, and can be used in connection therewith when desired.

By means of the discharge opening or slot $c$, formed as shown, in connection with a conical feed-wheel, I am enabled to get a gradual increase from a small or large quantity of seed to be sown, or vice versa.

I do not desire to limit myself to the exact form of discharge-opening and conical wheel, as the form of the discharge-opening might be changed, and any other form of feed-wheel used without materially affecting the desired result, although the above-described form of discharge-opening and conical feed-wheel is preferred.

I claim as my invention—

1. The combination, with a feed-case and feed-wheel, of a laterally-adjustable slotted semicircular plate, forming the bottom of the feed-case, substantially as and for the purpose herein shown and described.

2. The combination, with the feed-case and feed-wheel, of the laterally-adjustable slotted semicircular plate or bottom C $c$, the pointer $a$, and registering-plate $a'$, substantially as and for the purpose herein shown and described.

3. The scatterer F, having a narrow neck or point, $f$, convex portion $f^1$, and side channels $f^2 f^2$, as herein shown and described.

4. The combination, with the feed-wheel and shaft, provided with a screw-thread, of the gear G, formed with a hub, $g$, and the screw-nut $h$ and stationary nut $h'$, arranged as herein shown and described, whereby said feed-shaft can be thrown in and out of gear, substantially as specified.

5. The combination, with the feed-case, of a conical feed-wheel, and a laterally-adjustable bottom, provided with a nearly V-shaped discharge-opening, substantially as and for the purpose herein shown and described.

BYRON TOWN.

Witnesses:
   HENRY B. EASTMAN,
   K. GILLETT.